United States Patent
Li et al.

(10) Patent No.: US 12,112,622 B2
(45) Date of Patent: Oct. 8, 2024

(54) SYSTEMS AND METHODS FOR HETEROGENEOUS MULTI-AGENT MULTI-MODAL TRAJECTORY PREDICTION WITH EVOLVING INTERACTION GRAPHS

(71) Applicant: Honda Motor Co., Ltd., Tokyo (JP)

(72) Inventors: Jiachen Li, Albany, CA (US); Chiho Choi, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 723 days.

(21) Appl. No.: 17/024,080

(22) Filed: Sep. 17, 2020

(65) Prior Publication Data

US 2021/0287531 A1    Sep. 16, 2021

Related U.S. Application Data

(60) Provisional application No. 62/988,801, filed on Mar. 12, 2020.

(51) Int. Cl.
| | |
|---|---|
| G08G 1/01 | (2006.01) |
| G06F 17/18 | (2006.01) |
| G08G 1/015 | (2006.01) |

(52) U.S. Cl.
CPC ........... *G08G 1/0133* (2013.01); *G06F 17/18* (2013.01); *G08G 1/0129* (2013.01); *G08G 1/015* (2013.01)

(58) Field of Classification Search
CPC .... G08G 1/0133; G08G 1/0129; G08G 1/015; G08G 1/0112; G08G 1/0141; G08G 1/164; G08G 1/166; G06F 17/18; G06N 3/045; G06N 3/044; G06N 3/084; G06N 3/006
See application file for complete search history.

(56) References Cited

U.S. PATENT DOCUMENTS

| | | | |
|---|---|---|---|
| 2018/0124423 A1* | 5/2018 | Choi | G06V 10/82 |
| 2019/0228316 A1* | 7/2019 | Felsen | G06N 5/04 |
| 2020/0283016 A1* | 9/2020 | Blaiotta | G06N 20/00 |

(Continued)

OTHER PUBLICATIONS

Zhang, Y., Qin, L., Yao, H., Huang, Q.: Abnormal crowd behavior detection based on social attribute-aware force model. In: 2012 19th IEEE International Conference on Image Processing. pp. 2689-2692. IEEE (2012).

(Continued)

*Primary Examiner* — Tyler J Lee
(74) *Attorney, Agent, or Firm* — RANKIN, HILL & CLARK LLP

(57) ABSTRACT

The systems and methods herein utilize interactive Gaussian processes for crowd navigation. For example, an encoder receives sensor data and context information. The encoder also extracts interaction patterns from observed trajectories from the sensor data and context information. The encoder further generates a static latent interaction graph for a first time step based on the interaction patterns. A recurrent module generates a distribution of time dependent static latent interaction graphs iteratively from the first time step for a series of time steps based on the static latent interaction graph. The series of time steps are separated by a re-encoding gap. The decoder generates multi-modal distribution of future states based on the distribution of time dependent static latent interaction graphs.

19 Claims, 6 Drawing Sheets

(56) References Cited

U.S. PATENT DOCUMENTS

2021/0110089 A1* 4/2021 Chen ................. G06T 7/0004
2021/0149404 A1* 5/2021 Zeng ................. G06V 20/58

OTHER PUBLICATIONS

Alahi, A., Goel, K., Ramanathan, V., Robicquet, A., Fei-Fei, L., Savarese, S.: Social lstm: Human trajectory prediction in crowded spaces. In: Proceedings of the IEEE conference on computer vision and pattern recognition. pp. 961-971 (2016).
Chai, Y., Sapp, B., Bansal, M., Anguelov, D.: Multipath: Multiple probabilistic anchor trajectory hypotheses for behavior prediction. arXiv preprint arXiv:1910.05449 (2019).
Choi, C., Dariush, B.: Looking to relations for future trajectory forecast. arXiv preprint arXiv:1905.08855 (2019).
Deo, N., Rangesh, A., Trivedi, M.M.: How would surround vehicles move? a unified framework for maneuver classification and motion prediction. IEEE Transactions on Intelligent Vehicles 3(2), 129-140 (2018).
Gupta, A., Johnson, J., Fei-Fei, L., Savarese, S., Alahi, A.: Social gan: Socially acceptable trajectories with generative adversarial networks. In: Proceedings of the IEEE Conference on Computer Vision and Pattern Recognition. pp. 2255-2264 (2018).
Guttenberg, N., Virgo, N., Witkowski, O., Aoki, H., Kanai, R.: Permutation-equivariant neural networks applied to dynamics prediction. arXiv preprint arXiv:1612.04530 (2016).
Hasan, I., Setti, F., Tsesmelis, T., Del Bue, A., Galasso, F., Cristani, M.: Mx-lstm: mixing tracklets and vislets to jointly forecast trajectories and head poses. In: Proceedings of the IEEE Conference on Computer Vision and Pattern Recognition. pp. 6067-6076 (2018).
Helbing, D., Molnar, P.: Social force model for pedestrian dynamics. Physical review E 51(5), 4282 (1995).
Hong, J., Sapp, B., Philbin, J.: Rules of the road: Predicting driving behavior with a convolutional model of semantic Interactions. In: Proceedings of the IEEE Conference on Computer Vision and Pattern Recognition. pp. 8454-8462 (2019).
Hoshen, Y.: Vain: Attentional multi-agent predictive modeling. In: Advances in Neural Information Processing Systems. pp. 2701-2711 (2017).
Kasper, D., Weidl, G., Dang, T., Breuel, G., Tamke, A., Wedel, A., Rosenstiel, W.: Object-oriented bayesian networks for detection of lane change maneuvers. IEEE Intelligent Transportation Systems Magazine 4(3), 19-31 (2012).
Kipf, T., Fetaya, E., Wang, K.C., Welling, M., Zemel, R.: Neural relational inference for interacting systems. arXiv preprint arXiv:1802.04687 (2018).
Kosaraju, V., Sadeghian, A., Martin-Martin, R., Reid, I., Rezatofighi, H., Savarese, S.: Social-bigat: Multimodal trajectory forecasting using bicycle-gan and graph attention networks. In: Advances in Neural Information Processing Systems. pp. 137-146 (2019).
Li, J., Ma, H., Tomizuka, M.: Interaction-aware multi-agent tracking and probabilistic behavior prediction via adversarial learning. In: 2019 IEEE International Conference on Robotics and Automation (ICRA). IEEE (2019).
Ma, Y., Zhu, X., Zhang, S., Yang, R., Wang, W., Manocha, D.: Trafficpredict: Trajectory prediction for heterogeneous traffic-agents. In: Proceedings of the AAAI Conference on Artificial Intelligence. vol. 33, pp. 6120-6127 (2019).
Maddison, C.J., Mnih, A., Teh, Y.W.: The concrete distribution: A continuous relaxation of discrete random variables. arXiv preprint arXiv:1611.00712 (2016).
Moussaïd, M., Perozo, N., Garnier, S., Helbing, D., Theraulaz, G.: The walking behaviour of pedestrian social groups and its impact on crowd dynamics. PloS one 5(4) (2010).
Patil, A., Malla, S., Gang, H., Chen, Y.T.: The h3d dataset for full-surround 3d multi-object detection and tracking in crowded urban scenes. In: International Conference on Robotics and Automation (2019).
Rhinehart, N., McAllister, R., Kitani, K., Levine, S.: Precog: Prediction conditioned on goals in visual multi-agent settings. In: Proceedings of the IEEE International Conference on Computer Vision. pp. 2821-2830 (2019).
Robicquet, A., Sadeghian, A., Alahi, A., Savarese, S.: Learning social etiquette: Human trajectory understanding in crowded scenes. In: European conference on computer vision. pp. 549-565. Springer (2016).
Sadeghian, A., Kosaraju, V., Sadeghian, A., Hirose, N., Rezatofighi, H., Savarese, S.: Sophie: An attentive gan for predicting paths compliant to social and physical constraints. In: Proceedings of the IEEE Conference on Computer Vision and Pattern Recognition. pp. 1349-1358 (2019).
Sadeghian, A., Legros, F., Voisin, M., Vesel, R., Alahi, A., Savarese, S.: Car-net: Clairvoyant attentive recurrent network. In: Proceedings of the European Conference on Computer Vision (ECCV). pp. 151-167 (2018).
Salzmann, T., Ivanovic, B., Chakravarty, P., Pavone, M.: Trajectron++: Multi-agent generative trajectory forecasting with heterogeneous data for control. arXiv preprint arXiv:2001.03093 (2020).
Santoro, A., Raposo, D., Barrett, D.G., Malinowski, M., Pascanu, R., Battaglia, P., Lillicrap, T.: A simple neural network module for relational reasoning. In: Advances in neural information processing systems. pp. 4967-4976 (2017).
Su, S., Peng, C., Shi, J., Choi, C.: Potential field: Interpretable and unified representation for trajectory prediction. arXiv preprint arXiv:1911.07414 (2019).
Sun, L., Zhan, W., Tomizuka, M.: Probabilistic prediction of interactive driving behavior via hierarchical inverse reinforcement learning. In: 2018 21st International Conference on Intelligent Transportation Systems (ITSC). pp. 2111-2117. IEEE (2018).
Van Steenkiste, S., Chang, M., Greff, K., Schmidhuber, J.: Relational neural expectation maximization: Unsupervised discovery of objects and their interactions. arXiv preprint arXiv:1802.10353 (2018).
Vemula, A., Muelling, K., Oh, J.: Social attention: Modeling attention in human crowds. In: 2018 IEEE International Conference on Robotics and Automation (ICRA). pp. 1-7. IEEE (2018).
Wang, W., Xi, J., Zhao, D.: Learning and inferring a driver's braking action in car-following scenarios. IEEE Transactions on Vehicular Technology 67(5), 3887-3899 (2018).
Xu, Y., Piao, Z., Gao, S.: Encoding crowd interaction with deep neural network for pedestrian trajectory prediction. In: Proceedings of the IEEE Conference on Computer Vision and Pattern Recognition. pp. 5275-5284 (2018).
Yamaguchi, K., Berg, A.C., Ortiz, L.E., Berg, T.L.: Who are you with and where are you going? In: CVPR 2011. pp. 1345-1352. IEEE (2011).
M, S., Li, H., Wang, X.: Understanding pedestrian behaviors from stationary crowd groups. In: Proceedings of the IEEE Conference on Computer Vision and Pattern Recognition. pp. 3488-3496 (2015).
Zhang, P., Ouyang, W., Zhang, P., Xue, J., Zheng, N.: Sr-lstm: State refinement for lstm towards pedestrian trajectory prediction. In: Proceedings of the IEEE Conference on Computer Vision and Pattern Recognition. pp. 12085-12094 (2019).
Zhao, T., Xu, Y., Monfort, M., Choi, W., Baker, C., Zhao, Y., Wang, Y., Wu, Y.N.: Multi-agent tensor fusion for contextual trajectory prediction. In: Proceedings of the IEEE Conference on Computer Vision and Pattern Recognition. pp. 12126-12134 (2019).

\* cited by examiner

SYSTEMS AND METHODS FOR HETEROGENEOUS MULTI-AGENT MULTI-MODAL TRAJECTORY PREDICTION WITH EVOLVING INTERACTION GRAPHS

CROSS-REFERENCE TO RELATED APPLICATION

This application is related to U.S. Provisional Application Ser. No. 62/988,801 filed on Mar. 17, 2020, which is expressly incorporated herein by reference.

BACKGROUND

Multi-agent trajectory prediction is used in many real-world applications, such as autonomous driving, mobile robot navigation and other areas where a group of entities interact with each other. This gives rise to complicated behavior patterns at the level of both individuals and the multi-agent system as a whole. Since usually only the trajectories of individual entities are available without any knowledge of the underlying interaction patterns and there are usually multiple possible modalities for each agent, it may be challenging to model such dynamics and forecast their future behaviors. Some related techniques for multi-agent interaction modeling include, but are not limited to, social pooling layers, attention mechanisms, and message passing over fully-connected graphs.

BRIEF DESCRIPTION

According to one embodiment, a system for heterogeneous multi-agent multi-modal trajectory prediction is provided. The system includes an encoder, a recurrent module, and a decoder. The encoder receives sensor data and context information. The encoder then extracts interaction patterns from observed trajectories from the sensor data and context information. The encoder further generates a static latent interaction graph for a first time step based on the interaction patterns. The recurrent module generates a distribution of time dependent static latent interaction graphs iteratively from the first time step for a series of time steps based on the static latent interaction graph. The series of time steps are separated by a re-encoding gap. The decoder generates a multi-modal distribution of future states based on the distribution of time dependent static latent interaction graphs for trajectory prediction.

According to another embodiment, a method for heterogeneous multi-agent multi-modal trajectory prediction is provided. The method includes identifying a number of agents in a physical environment based on the sensor data. The method also includes receiving the sensor data and context information for the number of agents. The method further includes extracting interaction patterns from observed trajectories of the number of agents from the sensor data and context information. The method yet further includes generating a static latent interaction graph for a first time step based on the interaction patterns. The method also includes generating a distribution of time dependent static latent interaction graphs iteratively from the first time step for a series of time steps based on the static latent interaction graph. Time steps of the series of time steps are separated by a re-encoding gap. The method also includes generating a multi-modal distribution of future states based on the distribution of time dependent static latent interaction graphs.

According to yet another embodiment, a non-transitory computer readable storage medium storing instructions that, when executed by a computer having a processor, cause the computer to perform a method for heterogeneous multi-agent multi-modal trajectory prediction. The method also includes receiving the sensor data and context information associated with a number of agents. The method further includes extracting interaction patterns from observed trajectories from the sensor data and context information associated with the number of agents. The method yet further includes generating a static latent interaction graph for a first time step based on the interaction patterns. The method also includes generating a distribution of time dependent static latent interaction graphs iteratively from the first time step for a series of time steps based on the static latent interaction graph. Time steps of the series of time steps are separated by a re-encoding gap. The method also includes generating a multi-modal distribution of future states based on the distribution of time dependent static latent interaction graphs.

DETAILED DESCRIPTION

Figure 1:
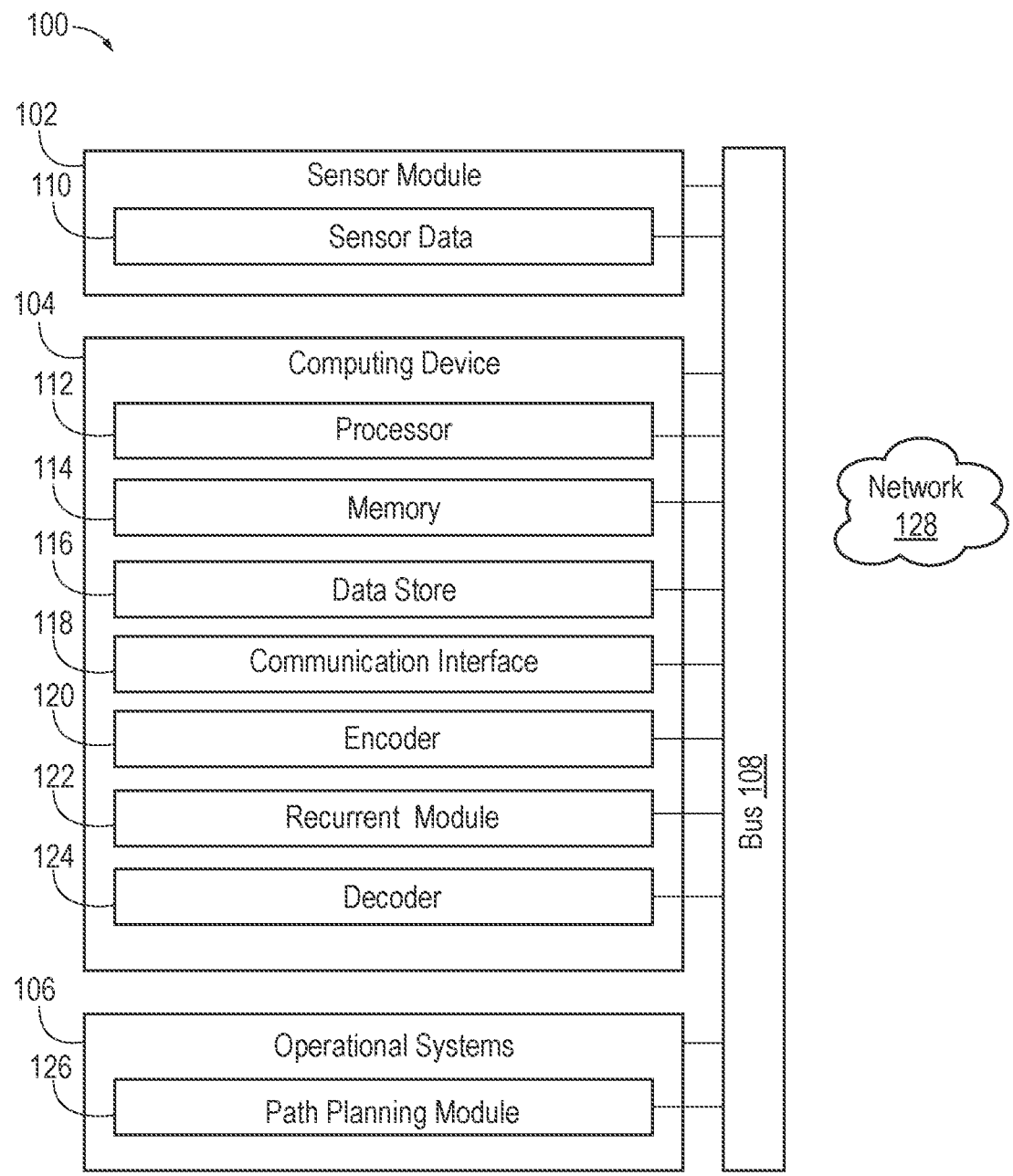
FIG. 1 is an exemplary component diagram of a system for heterogeneous multi-modal trajectory prediction, according to one aspect.

The systems and methods described herein are directed to heterogeneous multi-modal trajectory prediction. In many applications, effective understanding of the environment and accurate trajectory prediction of interactive agents may play a significant role in downstream tasks, such as decision and planning. The present systems and methods provide a framework for a generic trajectory forecasting framework with explicit interaction modeling via a latent interaction graph among multiple heterogeneous, interactive agents. The framework may consider the uncertainty and the possibility of different future behaviors. The framework may be designed to provide multi-modal prediction hypotheses. Since the interactions may be time-varying even with abrupt changes, and modalities may have interactions, adaptively evolving the interaction graph provides an effective solution.

In some embodiments, a double-stage training pipeline may be used to improve training efficiency and accelerate convergence. The pipeline may also enhance model performance in terms of prediction error. The proposed framework of the systems and methods may be evaluated on multiple public benchmark datasets in various areas for trajectory prediction. The agents may include robots, vehicles, pedestrians, cyclists sports and sports players, among others. Typically, fixed interaction patterns, which involve homogeneous types of agents do not distinguish between different types of agents. Moreover, typical systems only output single Gaussian distribution which may not capture the multi-modality of the agents in the future.

The framework, of the systems and methods described herein, provides for: extracting the underlying interaction patterns with a graph structure which is able to handle different types of agents in a unified way and evolve with time, predicting future trajectories based on the history information and extracted interaction graph, and capturing the dynamics of interaction graph evolution and the multi-modality of future trajectories. The framework may incorporate both trajectory information and context information such as sensor data, images, point cloud density maps, etc. A dynamic mechanism to evolve the underlying interaction graph adaptively with time may be used. This may capture the dynamics of interaction patterns among multiple agents. A double-stage training pipeline which not only improves training efficiency and accelerates convergence, but also enhances model performance in terms of prediction error is provided.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled object that moves through or manipulates an environment. Exemplary agents may include, but is not limited to, biological beings, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more users. Further, the term "vehicle" may include vehicles that are automated or non-automated with pre-determined paths or free-moving vehicles.

I. System Overview

The drawings are for purposes of illustrating one or more exemplary embodiments and not for purposes of limiting the same. FIG. 1 is an exemplary component diagram of an operating environment 100 for heterogeneous multi-modal trajectory prediction, according to one aspect. The operating environment 100 may include a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device may be implemented as a part of an agent. The agent may be bipedal, two-wheeled, four-wheeled robot, vehicle, or self-propelled machine. The autonomous ego agent may be configured as a humanoid robot. The humanoid robot may take the form of all or a portion of a robot. For example, the humanoid robot may take the form of an arm coupled to a hand with fingers. The computing device 104 may be implemented as part of a telematics unit, a head unit, a navigation unit, an infotainment unit, an electronic control unit, among others of an ego agent. The computing device 104 may also be implemented as a part of the agent via, for example, with other devices 630. In one embodiment, the components and functions of the computing device 104 may be implemented, for example, with a portable device) or another device connected via a network (e.g., a network 128).

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
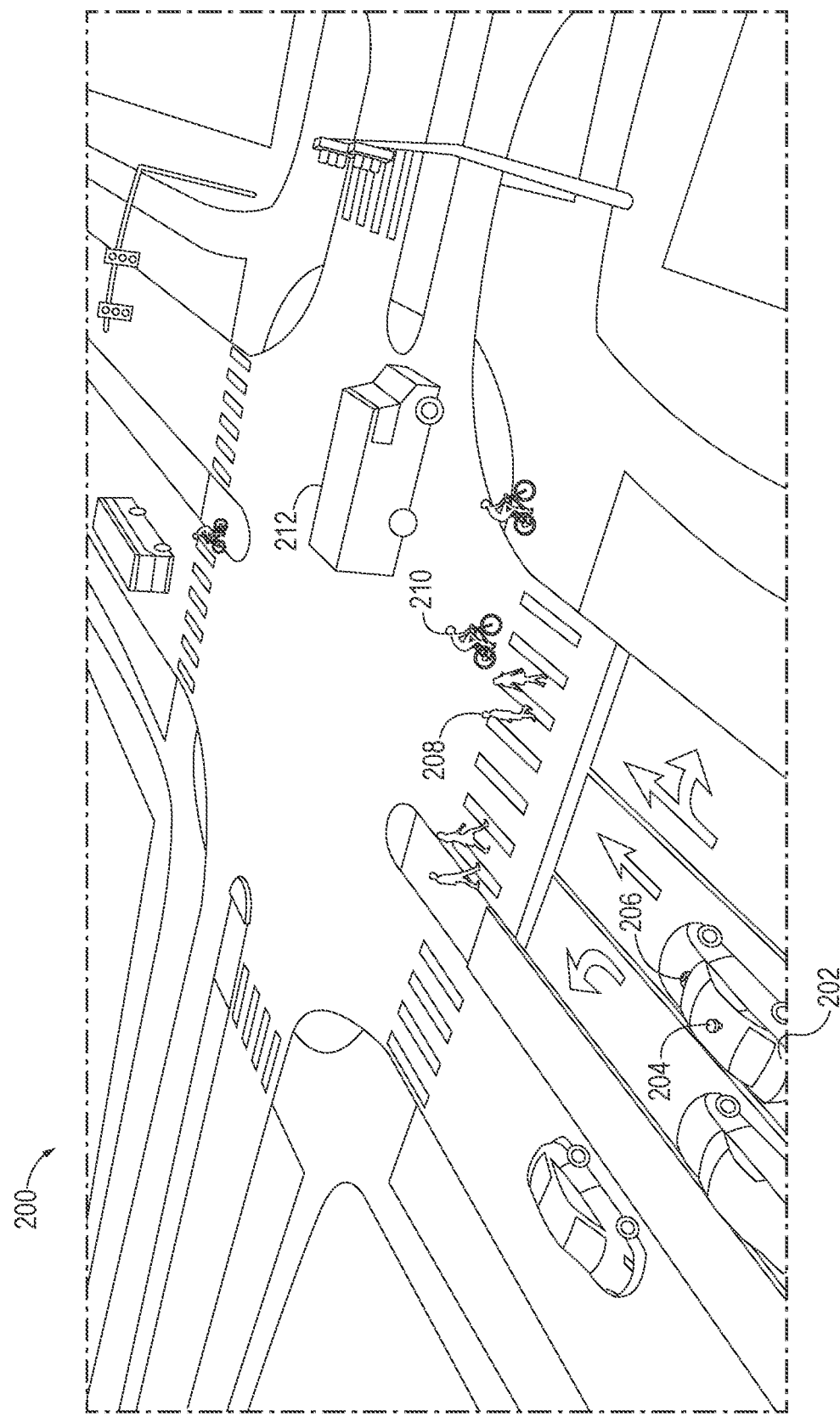
FIG. 2 is an exemplary agent environment for a system for heterogeneous multi-modal trajectory prediction, according to one aspect.

In some embodiments, the agent may be the ego agent 202 in the environment 200, shown in FIG. 2. The ego agent 202 may have one or more sensors. For example, the sensor of the ego agent 202 may include, but are not limited to, a depth sensor 204 and an image sensor 206. The depth sensor 204 and the image sensor 206 receive data from the environment 200. For example, the sensor of the ego agent may sense other agents in the environment 200 such as a first agent 208, a second agent 210, and a third agent 212. In addition to being a bipedal, two-wheeled, four-wheeled robot, vehicle, or self-propelled machine, the other agents may be biological entities, such as pedestrians, cyclists, motorcyclists, etc. Accordingly, the agents of the environment may be any number of types of agents. The types of agents may be differentiated into different categories based on agent characteristics such as agent identification, speeds of the agents, distances of the agents from the ego agent 202, a bearing or direction of travel of the agents, size of the agents, a position or a location associated with the agents, such as a lane location, coordinates, etc.

The sensor module 102 receives, provides, and/or senses information associated with the environment 200, the ego agent 202, the other agents, such as the first agent 208, the second agent 210, the third agent 212, the operating environment 100, and/or the operational systems 106. In one embodiment, the sensor module 102 receives depth data and image data from the depth sensor 204 and the image sensor 206, respectively.

The sensors, such as the depth sensor 204 and the image sensor 206, and/or the sensor module 102 are operable to sense a measurement of data associated with the environment 200, the ego agent 202, the first agent 208, the second agent 210, the third agent 212, the operating environment 100, and/or the operational systems 106 and generate a data signal indicating said measurement of data. These data signals may be converted into other data formats (e.g., numerical) and/or used by the sensor module 102, the computing device 104, and/or the operational systems 106 to generate other data metrics and parameters. It is understood that the sensors may be any type of sensor, for example, acoustic, electric, environmental, optical, imaging, light, pressure, force, thermal, temperature, proximity, gyroscope, and accelerometers, among others. Furthermore, a single sensor, such as the depth sensor 204 may be described, that includes multiple sensors and/or sensing components.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes an encoder 120, a recurrent module 122, and a decoder 124, for heterogeneous multi-modal trajectory prediction facilitated by the components of the operating environment 100. The encoder 120, the recurrent module 122, and the decoder 124, may be or be components of an artificial neural networks that act as a framework for machine learning, including deep learning. Furthermore, the encoder 120, the recurrent module 122, and/or the decoder 124 may include an input layer, an output layer, and one or more hidden layers, which may be convolutional filters.

The computing device 104 is also operably connected for computer communication (e.g., via the bus 108 and/or the communication interface 118) to one or more operational systems 106. The operational systems 106 may include, but are not limited to, any automatic or manual systems that may be used to enhance the agent, operation, and/or safety. The operational systems 106 may dependent on the implementation. For example, the operational system may include a path planning module 126. The path planning module 126 monitors, analyses, operates the ego agent 202 to some degree. As another example, in a vehicular embodiment, the operational systems 106 may include a brake system (not shown), that monitors, analyses, and calculates braking information and facilitates features like anti-lock brake system, a brake assist system, and an automatic brake prefill system.

The sensor module 102, the computing device 104, and/or the operational systems 106 are also operatively connected for computer communication to the network 128. The network 128 is, for example, a data network, the Internet, a wide area network (WAN) or a local area (LAN) network. The network 128 serves as a communication medium to various remote devices (e.g., databases, web servers, remote servers, application servers, intermediary servers, client machines, other portable devices). Using the system and network configuration discussed above, trajectories for the heterogeneous agents may be predicted. Detailed embodiments describing exemplary methods using the system and network configuration discussed above will now be discussed in detail.

II. Applied Methods

Figure 3:
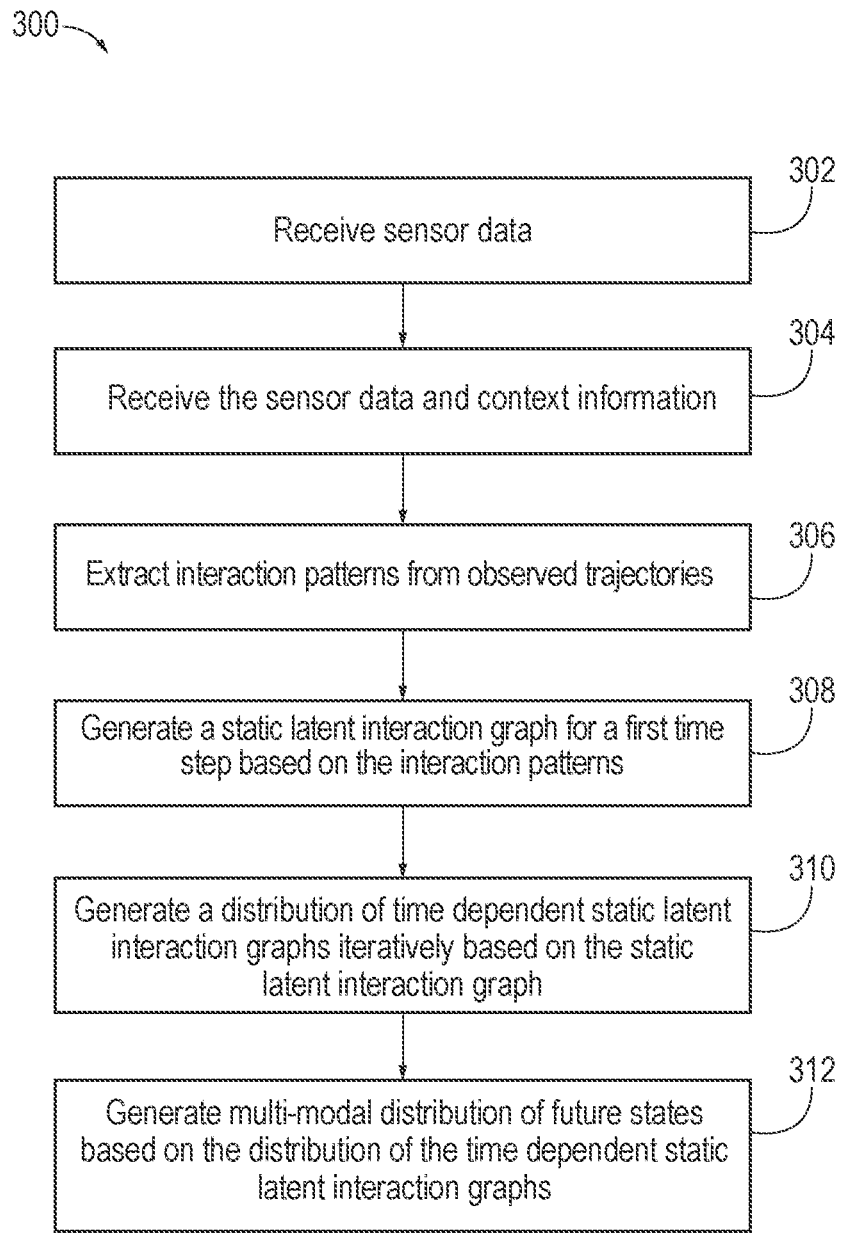
FIG. 3 is an exemplary process flow of a method for heterogeneous multi-modal trajectory prediction, according to one aspect.

Referring now to FIG. 3, a process flow of a method 300 for heterogeneous multi-modal trajectory prediction is provided. FIG. 3 will also be described with reference to FIGS. 1, 2, and 4-6. For simplicity, the method 300 will be described as a sequence of elements, but it is understood that the elements of the method 300 may be organized into different architectures, blocks, stages, and/or processes.

At block 302, the method 300 includes the encoder 120 receiving the sensor data 110 and context information. The sensor data 110 may include the context information identifying a number of agents. Turning to FIG. 2, the ego agent 202, the first agent 208, the second agent 210, and the third agent 212, among others are entities moving in a physical environment 200. The ego agent 202, the first agent 208, the second agent 210, and the third agent 212 may be humans, vehicles, robots, etc. The agents may be identified based on the sensor data 110 including, visual data, motion data, and physiological data, among others. The encoder 120 may detect or identify one or more of the entities, objects, obstacles, hazards, and/or corresponding attributes or characteristics associated with the environment 200. For example, the sensor data 110 may include an agent identification, speeds of the agents, distances of the agents from the ego agent 202, a bearing or direction of travel of the agents, size of the agents, a position or a location associated with the agents, such as a lane location, coordinates, etc.

In one or more embodiments, the encoder 120 may identify pavement lines, pavements markers (e.g., arrows, shapes, letters, numbers, etc.), road signs, roadway features (e.g., hard shoulders of a roadway, cliff edges, etc.) or road segments to facilitate lane recognition. In another embodiment, the encoder 120 may identify infrastructure of the environment 200. Further, the encoder 120 may identify or classify an agent of the agents as different types of agents. For example, the ego agent 202 and the third agent 212 may be identified to be in a vehicle category of agent. The first agent 208 may be identified to be in a pedestrian category of agent. The second agent 210 may be identified to be in a cyclist category of agent. The different categories of agents may be based on the type of locomotion (e.g., wheeled, bipedal, quadrupedal, etc.) of the agent, the speed at which the agent moves, the size of the agent, and/or other sensor data 110.

The sensor module 102 receives sensor data 110. The sensor data 110 may be received from the sensor system 130, remote devices (e.g., via the bus 108 and/or the communications interface 118), the depth sensor 204, the image sensor 206, and/or a biological entity. The sensor data 110 may include a video sequence or a series of images, user inputs, and/or data from the operational systems 106, such as data from a Controller Area Network (CAN) bus including as pedal pressure, steer angle, etc. The sensor system 130 may include one or more radar units, image capture components, sensors, cameras, gyroscopes, accelerometers, scanners (e.g., 2-D scanners or 3-D scanners), or other measurement components. In some embodiments, the sensor data 110 is augmented as additional sensor data from other sources is received. For example, the data from the CAN bus may be augmented by information the agents, the types of agent, and sensor data 110, among others.

The context data may be received by the encoder 120 and calculated by the processor 112. The context data may be received as an observation graph. The observation graph may be connected graph without self-loops that represents the observed information with node and edge attributes. Suppose that there are N heterogeneous agents in the environment 200, which belongs to M categories, the observation graph may then include N agent nodes and one context node. Accordingly, N is based on heterogeneity of the agents in the environment 200. Agent nodes are bidirectionally connected to each other, and the context node only have outgoing edges to each agent node.

At block 304, the method 300 includes the encoder 120 extracting interaction patterns from observed trajectories from the sensor data and context information. The encoder 120 extracts the underlying interaction patterns as a distribution of latent graphs. For example, suppose that the observation graph, may be mathematically denoted as $G_{obs} = \{V_{obs}, E_{obs}\}$, where $V_{obs} = \{\{v_i, v_c\}, i \in \{1, N\}\}$ and $\varepsilon_{obs} = \{e_{ij}, e_{cj}\}, i, j \in \{1, N\}\}$. $v_i$, $v_c$ and $e_{ij}$, $e_{cj}$ denote agent node attribute, context node attribute and agent-agent, context-agent edge attribute, respectively. An agent node may have two types of attributes: a self-attribute and a social-attribute. The self-attribute contains state information about the node. The social attribute contains state information about other nodes. The calculations of node/edge attributes are given by:

$$v_i^{self} = f_a^m(x_{i:T_h}^i), i \in \{1, \ldots, N\}, m \in \{1, \ldots, M\}, \quad (1)$$

$$v_c = f_c(c_{1:T_h}) \text{ or } v_c = f(c), \quad (2)$$

$$e_{ij}^1 = f_e^1([v_i^{self}, v_j^{self}]), e_{ic}^1 = f_{ec}^1([v^{self}, v_c]) \quad (3)$$

$$v_i^{social-1} = f_v^1([\Sigma_{i \neq j} \alpha_{ij} e_{ij}^1, e_{ic}^1]), \Sigma_{i \neq j} \alpha_{ij} = 1, \quad (4)$$

$$v_i^1 = [v_i^{self}, v_i^{social-1}], e_{ij}^2 = f_e^2([v_i^1, v_j^1]), \quad (5)$$

where $\alpha_{ij}$ are learnable attention coefficients, for $f_a^m(\bullet)$, $f_c(\bullet)$ are agent, context node embedding functions, and $f_e(\bullet)$, $f_{ec}(\bullet)$ and $f_v(\bullet)$ are agent-agent edge, agent context edge, and agent node update functions, respectively. Different types of nodes represent different agents and therefore use different embedding functions. The attributes of the context node are not updated and the edge attributes serve as intermediates for the update of agent node attributes. These f(•) functions are implemented by deep networks with proper architectures, which may be, for example, multi-layer perceptrons (MLPs). At this stage, a set of node/edge attributes may be generated which include the information of direct (first-order) interaction. The higher-order interactions may be modeled by multiple loops of equations (4) and (5), in which the social node attributes and edge attributes are updated by turns.

At block 306, the method 300 includes the encoder 120 generating a static latent interaction graph for a first time step based on the interaction patterns. The interaction graph is not node/edge attributed, which represents interaction patterns with a distribution of edge types for each edge. A hyperparameter L to denote the number of possible edge types (interaction types) between pairwise agent nodes to model agent-agent interactions. Also, there may be another edge type that is shared between the context node and all agent nodes to model agent-context interactions. In some embodiments, a "no edge" may also be treated as a special edge type, which implies that there is no message passing along such edges. More formally, the interaction graph is a discrete probability distribution $q(G|X_{1:T_h}, C_{1:T_h})$ or $(G|X_{1:T_h}, C)$, where $G = \{\{z_{ij}, z_{cj}\}, i, j \in \{1, N\}\}$ is a set of discrete random variables to indicate pairwise interaction types. Therefore, the encoder 120 may infer the latent interaction graph from the observation graph, which is a multi-class edge classification task. For example, a softmax function with a continuous approximation of the discrete distribution on the last updated edge attributes may be utilized to obtain the probability of each edge type, which is given by:

$$q(z_{ij}|X_{1:T_h}, C) = \text{Softmax}((e_{ij}^2 + g)/T), i, j \in \{1, N\}, \quad (6)$$

where g is a vector of i.i.d. samples drawn from Gumbel (0,1) distribution and T is the Softmax temperature, which controls the sample smoothness. Repramatrization may be used to obtain gradients for backpropagation. In this embodiment, the edge type between agent nodes and context node may be hard-coded with probability one. Therefore, the encoder 120 uses the sensor data 110, as an the observation graph, and the encoding process may be summarized as $q(z|X_{1:T_h}, C) = f_{enc}(X_{1:T_h}, C)$.

At block 308, the method 300 includes the recurrent module 122 generating a distribution of time dependent static latent interaction graphs iteratively from the first time step for a series of time steps based on the static latent interaction graph. The time steps of the series of time steps are separated by a re-encoding gap. In many embodiments, the interaction patterns computed from the past time steps are likely not static in the future. Instead, they are dynamic evolving throughout the future time steps from a first time step to a next time step and so on forming a series of time steps. A single static interaction graph is not sufficient to model such situations, especially those with abrupt changes. Moreover, many interaction systems have multi-modal properties in its nature. Different modalities afterwards are likely to represent different interaction patterns. Using only a single interaction pattern may not be appropriate to predict all the modalities. Therefore, the systems and methods herein provide an effective dynamic mechanism to evolve the interaction graph. Here, the distribution of time dependent static latent interaction graphs is generated based on an observation graph based on sensor data 110 at a corresponding time step of the series of time steps.

The encoding process is repeated every T (re-encoding gap) time steps to obtain the latent interaction graph based on the latest observation graph. A new interaction graph also has dependence on previous ones. To determine the effects of this dependence, recurrent module 122 is utilized to maintain and propagate the history information, as well as adjust the prior interaction graphs. More formally, the calculations are given by:

$$q(z(\beta)|X_1+\beta T:Th+\beta T,C)=f_{enc}(X_1+\beta T:Th+\beta T,C),$$

$$q(z'(\beta)|X_1+\beta T:Th+\beta T,C)=GRU(q(z(\beta)|X_1+\beta T:Th+\beta T,C),H_\beta)$$

where $\beta$ is the re-encoding index starting from 0, $z(\beta)$ is the interaction graph obtained from the static encoding process, $z'(\beta)$ is the adjusted interaction graph with time dependence, GRU is an operation of the recurrent module 122, and $H\beta$ is the hidden state of the recurrent module 122.

In particular, since in many real-world applications the state of agents has long-term dependence, a recurrent decoding process is applied to the interaction graph and observation graph to approximate the distribution of future trajectories $p(X_{T_h+1:T_h+T_f}|G, X_{1:T_h}, C)$. The output of each time step is K possible Gaussian distributions and their corresponding weights. The recurrent module 122 may include a decoding process having two stages: burn-in stage ($1 \le t \le T_h$) and prediction stage ($T_h+1 \le t \le T_h+T_f$), which are given by $$\tilde{e}_t^{ij}=\Sigma_{l=1}^L z_{ij,l} f_e^l([h_t^i m\ h_t^j]), MSG_t^j=\Sigma_{i \ne j} \tilde{e}_t^{ij} \quad (7)$$

$1 \le t \le T_h$ (Burn-in stage):

$$\tilde{h}_{t+1}^j=GRU^j([MSG_t^j,x_t^j,v_c],\tilde{h}_t^j) \quad (8)$$

$$w_{t+1}^{j,k}=f_{weight}^k(\tilde{h}_{t+1}^j) \quad (9)$$

$$\mu_{t+1}^{j,k}=x_t^j+f_{out}^k(\tilde{h}_{t+1}^j) \quad (10)$$

$$p(\hat{x}_{t+1}^j|z,x_{1:t}^j,c)=\Sigma_{k=1}^K w_{t+1}^{j,k} N(\mu_{t+1}^{j,k},\sigma^2 I), \quad (11)$$

$T_h+1 \le t \le T_h+T_f$ (Prediction stage):

$$\tilde{h}_{t+1}^j=GRU^{j([MSG_t^j,\hat{x}_t^j,v_c]}\tilde{h}_t^j) \quad (12)$$

$$w_{t+1}^{j,k}=f_{weight}^k(\tilde{h}_{t+1}^j) \quad (13)$$

$$\mu_{t+1}^{j,k}=x_t^j+f_{out}^k(\tilde{h}_{t+1}^j) \quad (14)$$

$$p(\hat{x}_{t+1}^j|z,\hat{x}_{T_h+1:t}^j,x_{1:T_h}^j,c)=\Sigma_{k=1}^K w_{t+1}^{j,k} N(\mu_{t+1}^{j,k},\sigma^2 I) \quad (15)$$

Drawing samples from categorical distribution $p(w_{t+1}^j|z, \hat{x}, x_{1:T_h}^j, c)$ where $\tilde{h}$ is the hidden state of $GRU^j$, $w_{t+1}^{j,k}$ is the weight of the kth Gaussian distribution at time step t+1 for agent j. $\tilde{f}(\bullet)$ is the edge update function of edge type l, $f_{weight}^k(\bullet)$ is a mapping function to get the weight of the kth Gaussian distribution, and $f_{out}^k(\bullet)$ is a mapping function to get the mean of the kth Gaussian component. In equation (12), $\hat{x}$ is given while in the previous step, here its corresponding distribution $p(\hat{x}|z, \hat{x}, x_{i:T_h}^j, c)$ from the previous step. The desired Gaussian distribution is first sampled from the categorical distribution ($w_t^j$). Suppose the kth one is determined, then use $u_t^{j,k}$ as $x_t^j$, which means the most likely posterior trajectory in this situation. The nodes (agents) of the same type as used by the recurrent module 122. During the burn-in stage, the ground-truth states are used; while during the prediction stage, the state prediction hypotheses are used as the input at the next time step iteratively. Accordingly, the historical time horizon is based on ground-truth states at the first time step corresponding to the static latent interaction graph, whereas the forecasting time horizon is based on a prediction hypothesis at a next time step of the series of time steps. For simplicity, the whole decoding process is summarized as $$(X_{T_h:T_h+T_f}|G, X_{1:T_h}, C)=f_{dec}(G, X_{1:T_h}, C).$$

At block 310, the method 300 includes the decoder 124 generating multi-modal distribution of future states based on the distribution of time dependent static latent interaction graphs. In this stage, the goal is to simultaneously teach an encoder that extracts the underlying interaction patterns as a distribution of latent graphs from the historical information, and a decoder that outputs a sequence of multi-modal distributions of future states based on the encoded interaction graph and historical information. The decoding and re-encoding processes are iterated to obtain the distribution of future trajectories.

Due to the uncertainty of human intention and interaction outcomes, the prediction model is desired to capture the multi-modality of human behaviors and generate diverse prediction hypotheses which represent various possible behavior patterns. Therefore, instead of outputting a deterministic trajectory at every step, several Gaussian distribution $N(\mu_t^{j,k}, \sigma^2)$ are output and their corresponding weights $w_t^{j,k}$ such that the model is output as a Gaussian distribution, but due to nature of multi-modality, each Gaussian distribution is supposed to represent the trajectory distribution in its own modality. Their weights represent the probability of the next step in each modality respectively. The decoder 124 outputs weights for the multi-modal distribution of future states based on probabilities of a next action for each modality represented in the sensor data 110. This is different from a traditional mixture density network, a fixed variance is set and use a slightly modified loss function definition instead of a traditional negative log-likelihood function.

However, directly training such a model tends to collapse to a single mode. To mitigate the mode collapse issue and encourage diverse trajectory generation, the Gaussian distribution is calculated from K Gaussian distribution candidates and used for iterative decoding. Using different Gaussian distributions and locations leads to different trajectories afterwards, which enables the model to generate multiple trajectories. Therefore, in the training process, the model is run a number of times, such as d times, after which d possible trajectories are generated for each agent under every specific scenarios. The trajectory with the minimal loss is selected to back propagate. Since the one with the minimal loss is the most likely to be in the same mode as the ground-truth. The predicted other trajectories may have much higher loss, but it does not necessarily mean that they are wrong.

In the training process, a loss function is defined as follows:

$$L = -E_{q_\varphi(z(\beta(t))|X_{1:T_h})}[\Sigma_{j=1}^{N} \Sigma t =_{\tau_h+1}^{T_h+T_f} \Sigma_{k=1}^{K} w_t^{j,k} \log p_t^{j,k}(x_t|z(\beta(t)))]$$

where $q_\varphi$ denotes the encoding and re-encoding operations, which return a factorized distribution of $z_{ij}$. $p_t^{j,k}(x_t|z(\beta(t)))$ denotes a certain Gaussian distribution; and where $q_{(\beta)}$ denotes the encoding and re-encoding operations, which returns a factorized distribution of $z_{ij}$. $p_t^{j,k}(x_t|z(\beta(t)))$ denotes a certain Gaussian distribution.

The encoding/decoding functions may use a static interaction graph. Then in the process of training dynamic interaction graph, the encoder 120 and the decoder 124 are used at the first stage to initialize the parameters of the modules used in the dynamic training.

This step is reasonable since the encoder 120 and the decoder 124 used in these two training process play the same role and their optima are supposed to be close. Accordingly, the systems and methods used herein may accelerate the training process and avoid some bad local optima to forecast future trajectories for multiple heterogeneous, interactive agents based on historical state information and/or context information.

Suppose there are N heterogeneous agents in the scene, which belongs to M categories (e.g. cars, cyclists, pedestrians). The number of agents may vary in different cases. A set of trajectories covering the historical and forecasting horizons given by ($T_n$ and $T_f$) are denoted as:

$$X_{1:T} = \{X_{1:T}^i | x_t^i = (x_t^i, y_t^i), T = T_h + T_f, i = 1, \ldots, N\},$$

where (x, y) is the 2D coordinate in the world space or image pixel space. A sequence of historical context information, such as images or tensors, are denoted as $C_{1:T_h} = \{c_{1:T_h}\}$ for dynamic scenes or fixed context information C for static scenes. For simplicity, C is used when referring to the context information in the equations. In some embodiments, future information is accessible during a training stage. A conditional distribution $p(X_{T_h+1:T_h+T_f}|X_{1:T_h}, C_{1:T_h})$ may be estimated for dynamic scenes or $p(X_{T_h+1:T_h+T_f}|X_{1:T_h}, C_{1:T_h}, C)$ for static scenes. The predicted distribution may be multimodal to represent uncertainty.

Figure 4:
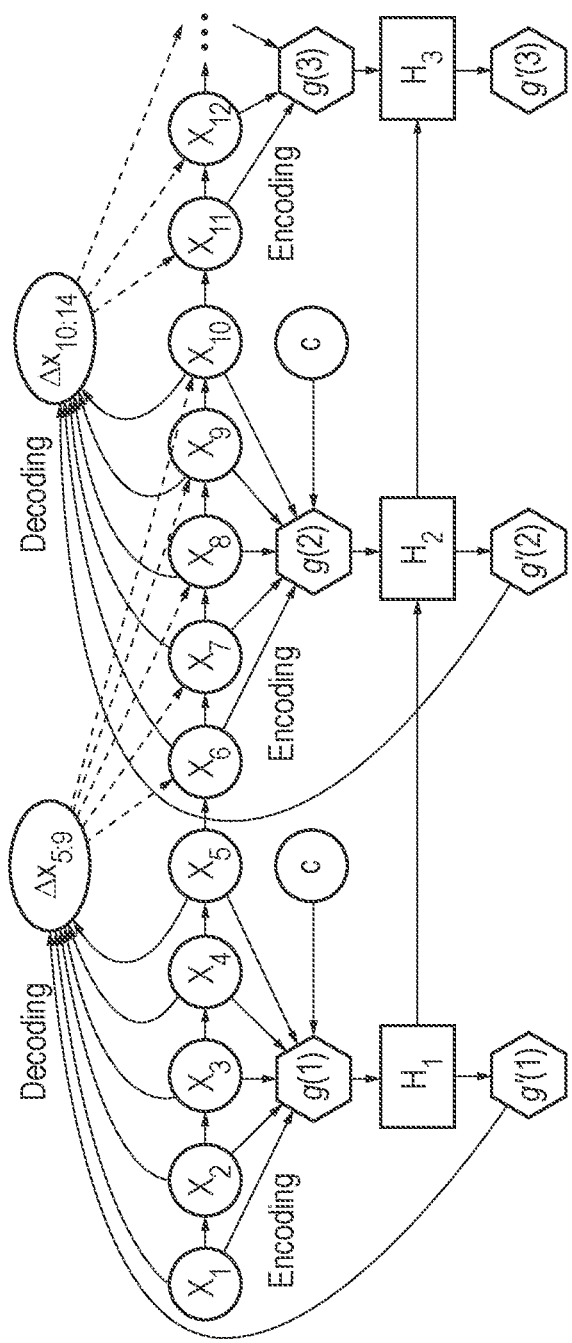
FIG. 4 is an exemplary system map for heterogeneous multi-modal trajectory prediction, according to one aspect.

As one embodiment shown in FIG. 4, a high-level graphical illustration, suppose that encoding and decoding horizons are both set to 5 without loss of generality. $x_t$ denotes the state at time step t, $\Delta x_t$ denotes the change in state, and c denotes context information. G(•) denotes the latent interaction graph obtained from the static encoding process, and G'(•) denotes the adjusted interaction graph with time dependence which is the output of the recurrent network with hidden state H. At each encoding-decoding iteration, G(•) may be obtained through the encoding of previous trajectories and context information, which goes through a recurrent unit to get the adjusted interaction graph G(•). Generally, the previous trajectories and G'(•) are combined as the input of the decoding process, which generates distributions of future trajectories.

Multiple types of context information (e.g. static/dynamic, scene images/point cloud density maps) may be incorporated in the framework together with the trajectory information. In order to capture the underlying dynamics of the evolution of interaction patterns, a dynamic mechanism to evolve the interaction graph is described, which is trained in two consecutive stages. The double-stage training mechanism may speed up convergence as well as enhance prediction performance. The method is able to capture the multi-modality of future behaviors. The proposed framework is validated by multiple trajectory forecasting benchmarks for different applications, which achieves state-of-the-art performance in terms of prediction accuracy.

Figure 5:
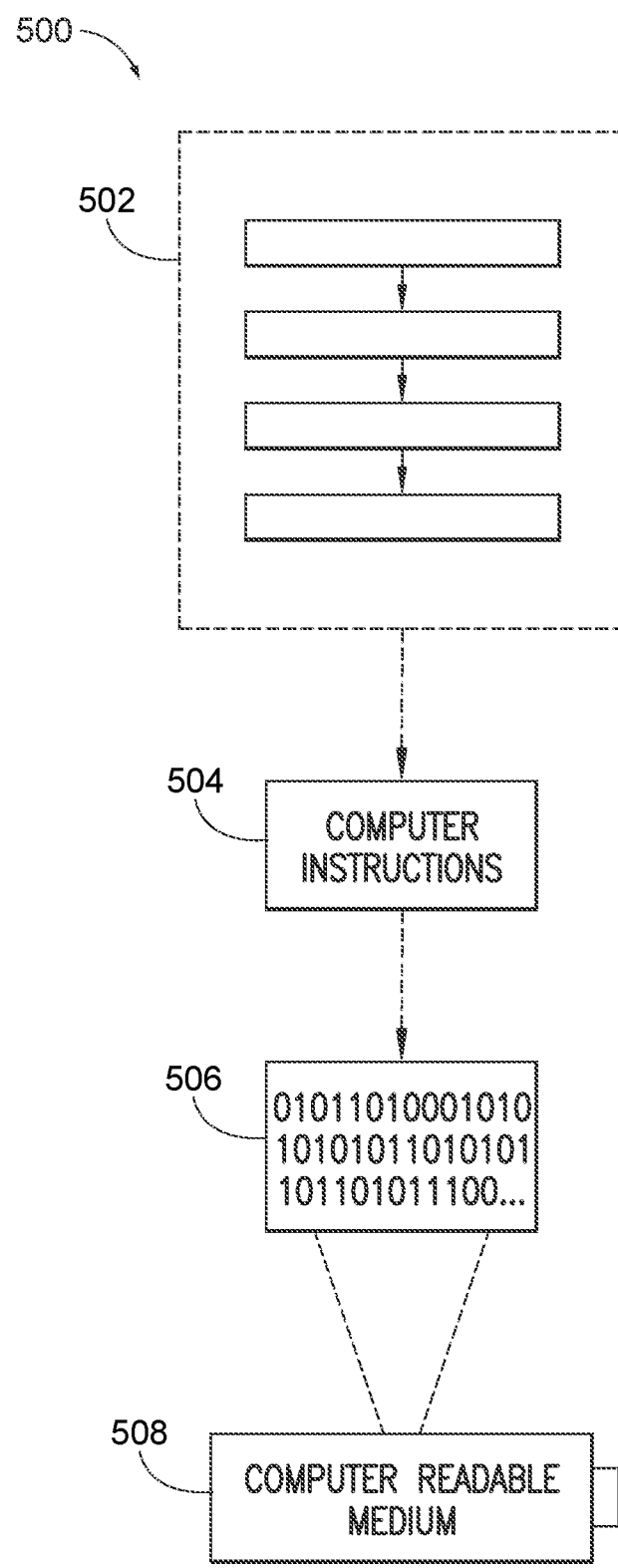
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3. In another aspect, the processor-executable computer instructions 504 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
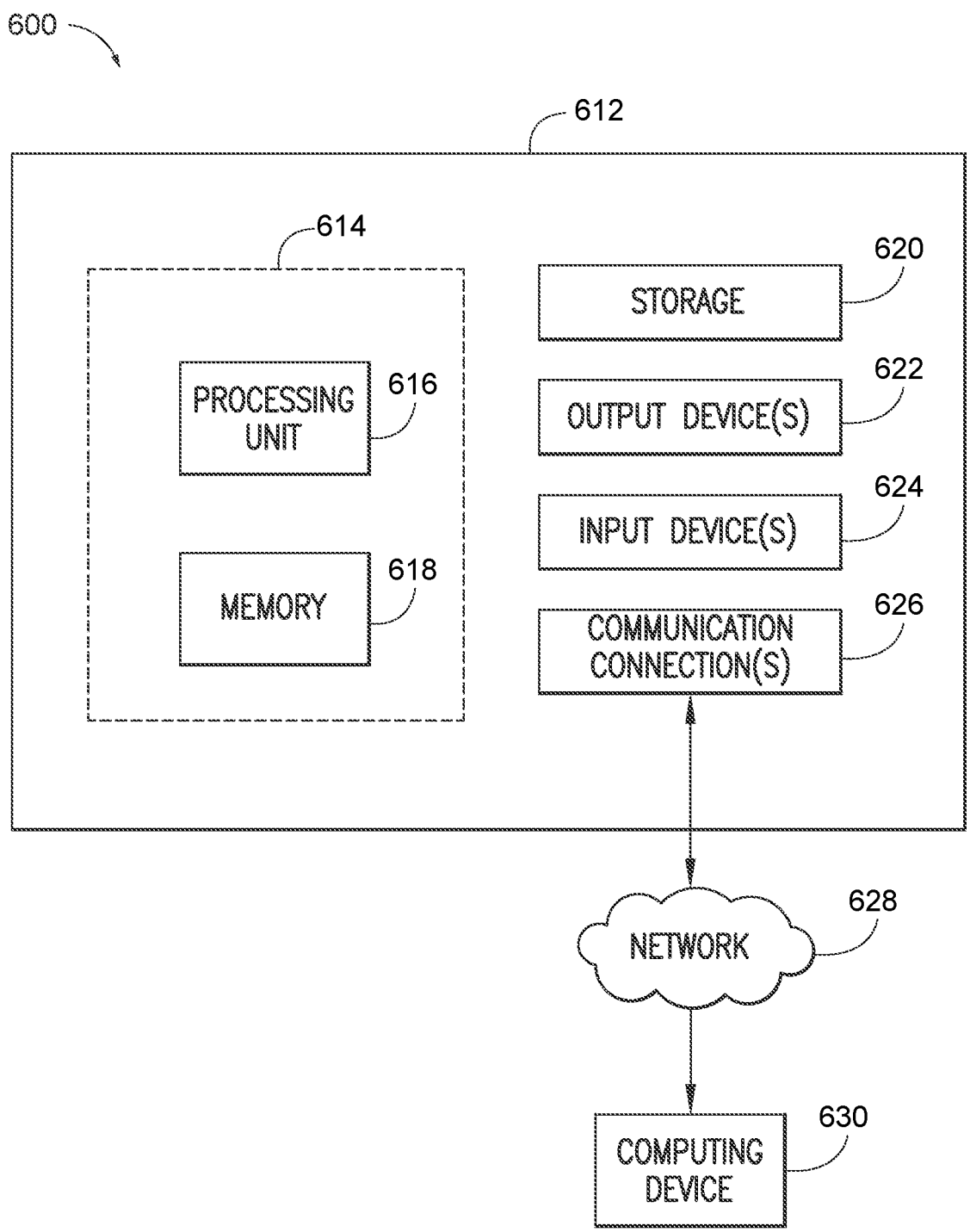
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including an apparatus 612 configured to implement one aspect provided herein. In one configuration, the apparatus 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the apparatus 612 includes additional features or functionality. For example, the apparatus 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 612. Any such computer storage media is part of the apparatus 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 612 includes input device(s) 624 such as keyboard, mouse, pen, voice input device, touch input device, infrared cameras, video input devices, or any other input device. Output device(s) 622 such as one or more displays, speakers, printers, or any other output device may be included with the apparatus 612. Input device(s) 624 and output device(s) 622 may be connected to the apparatus 612 via a wired connection, wireless connection, or any combination thereof. In one aspect, an input device or an output device from another computing device may be used as input device(s) 624 or output device(s) 622 for the apparatus 612. The apparatus 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for heterogeneous multi-agent multi-modal trajectory prediction, comprising:
 a processor;
 an encoder, implemented via the processor, configured to iteratively perform an encoding process for a plurality of time steps defined as a re-encoding gap, the encoding process causing the processor to:
  receive sensor data and context information as context data in a form of an observation graph having agent nodes bidirectionally connected to each other and at least one context node having outgoing edges to each of the agent nodes;
  extract interaction patterns from observed trajectories from the context data; and
  generate a static latent interaction graph for a first time step based on the interaction patterns;
 a recurrent module, implemented via the processor, configured to generate a distribution of time dependent static latent interaction graphs iteratively from the first time step for a series of time steps based on the static latent interaction graph, wherein time steps of the series of time steps are separated by the re-encoding gap; and a decoder, implemented via the processor, configured to generate a multi-modal distribution of future states based on the distribution of time dependent static latent interaction graphs.

2. The system of claim 1, wherein the distribution of time dependent static latent interaction graphs is generated based on an observation graph based on sensor data at a corresponding time step of the series of time steps.

3. The system of claim 1, wherein the distribution of time dependent static latent interaction graphs is a Gaussian distribution over the series of time steps.

4. The system of claim 1, wherein the decoder operates in a first stage and a second stage for the distribution of time dependent static latent interaction graphs, wherein the first stage is based on a historical time horizon and the second stage is based on a forecasting time horizon.

5. The system of claim 4, wherein in the first stage the decoder is configured to use ground-truth states at the first time step corresponding to the static latent interaction graph.

6. The system of claim 4, wherein in the second stage the decoder is configured to use prediction hypothesis at a next time step of the series of time steps.

7. The system of claim 1, wherein the decoder is further configured to output weights for the multi-modal distribution of future states based on probabilities of a next action for each modality represented in the sensor data.

8. A method for heterogeneous multi-agent multi-modal trajectory prediction, comprising:

performing an encoding process, iteratively, for a plurality of time steps defined as a re-encoding gap, wherein the encoding process includes receiving sensor data and context information as context data, the context data being in a form of an observation graph having agent nodes bidirectionally connected to each other and at least one context node having outgoing edges to each of the agent nodes, associated with a number of heterogeneous agents, extracting interaction patterns from observed trajectories from context data, and generating a static latent interaction graph for a first time step based on the interaction patterns;

generating a distribution of time dependent static latent interaction graphs iteratively from the first time step for a series of time steps based on the static latent interaction graph, wherein time steps of the series of time steps are separated by the re-encoding gap; and generating a multi-modal distribution of future states based on the distribution of time dependent static latent interaction graphs.

9. The method of claim 8, wherein the distribution of time dependent static latent interaction graphs is generated based on an observation graph based on sensor data at a corresponding time step of the series of time steps.

10. The method of claim 8, wherein the distribution of time dependent static latent interaction graphs is a Gaussian distribution over the series of time steps.

11. The method of claim 8, wherein generating the multi-modal distribution of future states includes a first stage and a second stage, and wherein the first stage is based on a historical time horizon and the second stage is based on a forecasting time horizon.

12. The method of claim 11, wherein the historical time horizon is based on ground-truth states at the first time step corresponding to the static latent interaction graph, and wherein the forecasting time horizon is based on a prediction hypothesis at a next time step of the series of time steps.

13. The method of claim 8, the method further comprising:

outputting weights for the multi-modal distribution of future states based on probabilities of a next action for each modality represented in the sensor data.

14. A non-transitory computer readable storage medium storing instructions that when executed by a computer having a processor to perform a method for heterogeneous multi-agent multi-modal trajectory prediction, the method comprising:

performing an encoding process, iteratively, for a plurality of time steps defined as a re-encoding gap, wherein the encoding process includes receiving sensor data and context information as context data, the context data being in a form of an observation graph having agent nodes bidirectionally connected to each other and at least one context node having outgoing edges to each of the agent nodes, associated with a number of heterogeneous agents, extracting interaction patterns from observed trajectories from the context data, and generating a static latent interaction graph for a first time step based on the interaction patterns;

generating a distribution of time dependent static latent interaction graphs iteratively from the first time step for a series of time steps based on the static latent interaction graph, wherein time steps of the series of time steps are separated by the re-encoding gap; and generating a multi-modal distribution of future states based on the distribution of time dependent static latent interaction graphs.

15. The non-transitory computer readable storage medium of claim 14, wherein the distribution of time dependent static latent interaction graphs is generated based on an observation graph based on sensor data at a corresponding time step of the series of time steps.

16. The non-transitory computer readable storage medium of claim 14, wherein the distribution of time dependent static latent interaction graphs is a Gaussian distribution over the series of time steps.

17. The non-transitory computer readable storage medium of claim 14, wherein generating the multi-modal distribution of future states includes a first stage and a second stage, and wherein the first stage is based on a historical time horizon and the second stage is based on a forecasting time horizon.

18. The non-transitory computer readable storage medium of claim 17, wherein the historical time horizon is based on ground-truth states at the first time step corresponding to the static latent interaction graph, and wherein the forecasting time horizon is based on a prediction hypothesis at a next time step of the series of time steps.

19. The non-transitory computer readable storage medium of claim 14, wherein the method further comprises outputting weights for the multi-modal distribution of future states based on probabilities of a next action for each modality represented in the sensor data.

* * * * *